3,247,163
CURABLE COMPOSITIONS OF A POLYEPOXIDE AND A REACTION PRODUCT OF AN AMINE AND AN ACRYLATE
Norman H. Reinking, Millington, N.J., assignor to Union Carbide Corporation, a corporation of New York
No Drawing. Filed Oct. 14, 1960, Ser. No. 62,559
8 Claims. (Cl. 260—47)

This invention relates to curable polyepoxide compositions and to cured products obtained therefrom. More specifically, this invention relates to curable, polyepoxide compositions which contain an adduct of an organic amine and an acrylate as the curing agent and which have particular utility in the production of shaped articles which are characterized by excellent flexibility and excellent toughness.

Polyepoxide compositions usually contain curing agents which effect a cure of the compositions to a hard, tough, infusible state, generally upon application of heat thereto. It has been found, however, that polyepoxide compositions containing conventional curing agents such as diethylenetriamine and triethylenetetramine, upon curing, are characterized by poor impact strength and by poor flexibility. Consequently, it has been necessary to add to polyepoxide compositions materials which are designed to improve the impact strength and flexibility characteristics of these compositions so that they can be fully utilized for the production of tough and flexible articles which can be used, for example, as electrical castings, and as jigs and fixtures in automotive and aircraft tooling work.

Illustrative of materials which have been commonly added to polyepoxide compositions in order to improve the impact strength and flexibility of the cured products formed therefrom are the polysulfides, such as the liquid polysulfide, manufactured by Thiokol Chemical Co., which is sold under the designation "Thiokol LP–3," and has the formula:

$$HS(C_2H_4OCH_2OC_2H_4-SS)_{42}C_2H_4OCH_2OC_2H_4SH$$

and the polyamide produced by condensing dilinoleic acid and ethylene diamine, which is made commercially available by the General Mills Co. and sold under the trade name "Versamid."

The "impact strength improvers" and the "flexibilizers," particularly of the type described, have proved to be undesirable for use as additives to polyepoxide compositions since they impart to these compositions a disagreeable odor and an undesirable dark color. In addition, these additives tend to interfere with the curing mechanism involving the polyepoxides and the curing agents, thus increasing the amount of curing agent required in each polyepoxide composition in order to cure the composition to a hard, tough, infusible product.

The present invention provides for polyepoxide compositions which, when cured, have excellent impact strength and excellent flexibility. They do not require, therefore, any "impact strength improvers" and/or "flexibilizers." Since no additives need be incorporated into the compositions of the present invention for purposes of improving their impact strength and/or their flexibility, once cured, there is no possibility of affecting the curing mechanism between the polyepoxides and the curing agents. Furthermore, the cured products of the compositions of this invention, in addition to possessing excellent impact strength and excellent flexibility are of a desirable light color and have no undesirable odor.

The curable compositions of this invention comprise a polyepoxide having an epoxy equivalency of greater than one, and an adduct or more specifically a reaction product of an organic amine and an acrylate which has the general formula:

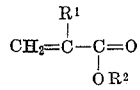

wherein: $R^2$ is an alkylradical, preferably containing from 1 to 18 carbon atoms inclusive; $R^1$ is either hydrogen or alkyl and when alkyl, preferably containing a maximum of 2 carbon atoms; and the adduct itself contains an average of more than 2 amino-hydrogen atoms per molecule, preferably at least 3 amino-hydrogen atoms per molecule.

Illustrative of acrylates having the general formula previously given which can be reacted with organic amines to produce the organic amine-acrylate adducts are the following: methylacrylate, ethylacrylate, n-propylacrylate, isopropylacrylate, n-butylacrylate, n-amylacrylate, n-hexylacrylate, 2-ethylhexylacrylate, n-octylacrylate, n-nonylacrylate, n-laurylacrylate, n-pentadecylacrylate, n-octadecylacrylate, methylmethacrylate, methylethacrylate, isopropylmethacrylate, n-hexylmethacrylate, n-nonylmethacrylate, ethylethacrylate, n-propylethacrylate, n-butylethacrylate, n-amylethacrylate, n-hexylethacrylate, 2-ethylhexylethacrylate, n-octadecylethacrylate and the like.

Organic amines suitable for reaction with the acrylates to produce the amine-acrylate adducts are those having the general formula:

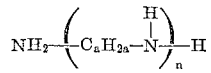

wherein $a$ has a value of 2 to 10 inclusive, preferably 2 to 6 inclusive and $n$ has a value of 1 to 6 inclusive preferably 1 to 4 inclusive. Among suitable organic amines having the general formula noted are: 1,2-diaminoethane, 1,3-diaminopropane, 1,4-diaminobutane, 1,5-diaminopentane, 1,6-diaminohexane, 1,8-diaminooctane, 1,9-diaminononane, 1,10-diaminodecane, diethylenetriamine, triethylenetetramine, tetraethylenepentamine, dipropylenetriamine and other such amines.

The preparation of the organic amine-acrylate adducts can be conveniently accomplished by heating, at elevated temperatures, a mixture containing the desired organic amine and acrylate. For instance, when reacting an organic amine containing at least 4 amino-hydrogen atoms, with, for example, 2 moles of an acrylate, it is customary to heat the reactants to a temperature of about 70° C. to about 150° C. to produce the corresponding organic amine-acrylate adduct. This reaction can be represented by the equation which follows:

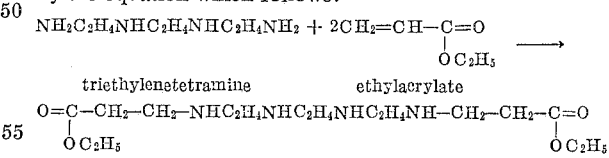

If desired, 2 moles of the organic amine per mole of the acrylate can be used, in which case the reaction can proceed as follows:

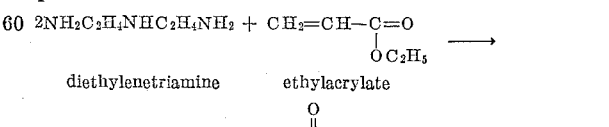

When using an organic amine containing only 3 amino-hydrogen atoms per molecule, it is then customary to react a mixture containing at least 2 moles of organic amine per mole of acrylate in order to obtain an adduct containing an average of more than 2 amino-hydrogen atoms per molecule. In that event, the reaction will proceed in a manner described in the preceding paragraph.

For purposes of this invention, the organic amine-acrylate adduct must contain an average of more than two amino-hydrogen atoms per molecule preferably at least 3 amino-hydrogen atoms per molecule in order to provide an adduct which will cure polyepoxides to a hard, tough infusible state. Generally, the number of moles of acrylate, per mole of amine, in a reaction mixture containing the amine and the acrylate will be at least 0.5 and a maximum value equal to or less than the number of amino hydrogen atoms of the amine minus two. It is obvious that mixtures of primary, secondary, and tertiary amines will be produced when the acrylates are reacted with the organic amines. Mainly, however, the reaction between the organic amine and acrylate is one wherein the primary amino group or groups of the amine, being more reactive will preferentially react with the acrylate.

Preparation of organic amine-acrylate adducts is further described by S. M. McElvain and K. Rorig in J. Am. Chem. Soc., vol. 70 (1948), pages 1822 and 1826.

The polyepoxides which can be cured with the amine-acrylate adducts are those organic compounds having an epoxy equivalency of greater than one, that is, compounds having an average of more than one epoxy group, i.e.,

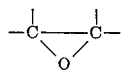

per molecule. These compounds, wherein the oxygen of the epoxy group is attached to vicinal carbon atoms, can be saturated or unsaturated, aliphatic, cycloaliphatic, or heterocyclic, and can be substituted, with substituents such as halogen atoms, alkyl groups, ether groups, and the like.

In further explanation of the term "epoxy equivalency" as used in this specification, it refers to the average number of epoxy groups contained in the average polyepoxide molecule. This value is obtained by dividing the molecular weight of the polyepoxide by its calculated epoxide equivalent weight. The epoxide equivalent weight is determined by heating a one gram sample of the polyepoxide with an excess of pyridinium chloride which is dissolved in pyridine. The excess pyridinium chloride is then back-titrated with 0.1 N sodium hydroxide to an end point using phenolphthalein as the indicator. The epoxide equivalent weight is calculated by considering that one HCl molecule is equivalent to one expoxide group. If the polyepoxide is a single compound and all of its epoxy groups are intact, the epoxy equivalency values will be integers of whole numbers, such as 2, 3, 4 and the like. In those instances wherein the polyepoxide is a mixture of polyepoxides or contains some monomeric monoepoxides or where the polyepoxide has some of its epoxy groups hydrated or otherwise reacted, the epoxy equivalency values may contain fractions, such as 1.2, 1.5, 2.8, and the like.

Illustrative of polyepoxides which can be cured with the amine-acrylate adducts are the polyglycidyl ethers of polyhydric phenols, exemplified by the polyglycidyl ethers of such phenols as the mononuclear polyhydric phenols, resorcinol and pyrogallol, the di- or polynuclear phenols, such as the bisphenols described in Bender et al. U.S. 2,506,486 and polyphenylols such as the novolak condensation products of a phenol and a saturated or unsaturated aldehyde containing an average of from 3 to 20 or more phenylol groups per molecule (cf. "Phenoplasts" by T. S. Carswell, published 1947 by Interscience Publishers, New York). Exemplary of suitable polyphenylols derived from a phenol and an unsaturated aldehyde such as acrolein are the triphenylols, pentaphenylols, and heptaphenylols described in U.S. 2,885,385 to A. G. Farnham. The phenols may contain substituents such as alkyl or aryl ring substituents or halogens, as exemplified by the alkyl resorcinols, tribromoresorcinol, and the diphenols containing alkyl and halogen substituents on the aromatic ring (Bender et al. U.S. 2,506,486). The polyhydric polynuclear phenols can consist of two or more phenols connected by such groups as methylene, alkylene, or sulfone. The connecting groups are further exemplified by bis(p-hydroxyphenyl)-methane, 2,2-bis(p-hydroxyphenyl)-propane, and dihydroxydiphenyl sulfone.

Process for the preparation of polyglycidyl ethers of polyhydric phenols is described in detail in the Bender et al. patent (supra) and U.S. 2,801,989 to A. G. Farnham.

Particularly desirable for purposes of this invention are the polyglycidylethers of the bis(hydroxyphenyl)-alkanes as for example, the diglycidyl ether of 2,2-bis-(p-hydroxyphenyl)-propane and the diglycidyl ether of bis(p-hydroxylphenyl)-methane. Other suitable polyglycidyl ethers of polyhydric phenols are enumerated in U.S. Patent 2,633,458 to E. C. Shokal.

Also suitable are the polyglycidyl ethers of polyhydric alcohols, such as the reaction products of epichlorohydrin and aliphatic compounds containing from two to four alcoholic hydroxyl groups, such as ethylene glycol, propane diols, butane diols, glycerine, hexane triols, and the like. (Methods of preparing polyglycidyl ethers of polyhydric alcohols are described in U.S. 2,898,349 to P. Zuppinger et al.)

Other suitable polyglycidyl compounds are the polyglycidyl esters of polycarboxylic acids, such as the polyglycidyl esters of adipic acid, phthalic acid, and the like. Polyglycidyl esters of polycarboxylic acids are described in detail in U.S. 2,870,170 to Payne et al. Also suitable are polyglycidyl compounds produced by reacting epichlorohydrin with aromatic amines, such as aniline, 2,6-dimethyl aniline, p-toluidine, m-chloraniline, p-aminodiphenyl, m-phenylene diamine, p-phenylene diamine, 4,4'-diaminodiphenyl methane, or with amino phenols such as p-amino phenol, 5-amino-1-n-naphthol, 4-amino resorcinol, 2-methyl-4-amino phenol, 2-chloro-4-aminophenol, and the like. Specific compounds include, among others, N,N-diglycidyl aniline, N,N-diglycidyl-2,6-dimethyl aniline, N,N,N',N'-tetraglycidyl-4,4'-diamino diphenyl methane, the triglycidyl derivative of p-amino phenol wherein the amino-hydrogen and OH hydrogen atoms are replaced by glycidyl groups. Polyglycidyl derivatives of aromatic amines and amino phenols and methods for their preparation are further described in U.S. Patents 2,951,825 and 2,951,822 to N. H. Reinking et al. and N. H. Reinking, respectively. The so-called peracetic acid epoxies which are obtained by epoxidation across a double bond using peracetic acid, such as bis-(2,3-epoxycyclopentyl) ether and the like are also suitable.

It is to be understood that all patents and literature references referred to in this specification are incorporated herein by reference.

Various amounts of the organic amine-acrylate adducts can be used to cure the polyepoxides to a hard, tough, infusible state. Generally, the organic amine-acrylate adducts are used in amounts such as to provide from about 0.2 to about 5 amino hydrogen atoms per epoxy group, preferably in amounts so as to provide from about 0.5 to about 1.5 amino-hydrogen atoms per epoxy group. For optimum results, however, the organic amine-acrylate adducts are used in stoichiometric amounts. For purposes of stoichiometric calculations, one epoxy group:

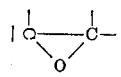

is deemed to react with one amino hydrogen atom. The actual amount of organic amine-acrylate adduct used will depend upon the desired end properties of the resultant cured polyepoxide composition. For example, increasing the amount of adduct used, tends to increase the flexibility of the cured composition.

The polyepoxides and the organic amine-acrylate adducts are combined by simply admixing the two together, generally at room temperature.

In those instances wherein the polyepoxide is a relatively low viscosity liquid, it is admixed directly with the adduct. Polyepoxides which are too viscous for ready mixing with the adducts can be heated to reduce their viscosity or liquid solvents can be added thereto in order to provide the desired fluidity. Normally solid polyepoxides are either melted or mixed with liquid solvents.

Suitable solvents for imparting the desired fluidity to highly viscous or normally solid polyepoxides are ketones, such as acetone, methyl isobutyl ketone, isophorone, and the like; esters, such as ethyl acetate, butyl acetate, ethylene glycol monoacetate, acetate of ethylene glycol monomethyl ether, and the like; ether alcohols, such as the methyl, ethyl, and butyl ether of ethylene glycol or of diethylene glycol; chlorinated hydrocarbons, such as trichloropropane, chloroform, and the like. Also suitable in admixture with the solvents noted are the aromatic hydrocarbons, such as benzene, toluene, xylene, and the like; alcohols, such as ethyl alcohol, isopropyl alcohol, n-butyl alcohol, and the like. The actual amount of solvent used will depend upon the polyepoxide being employed. If desired, rather than using solvents of the type described, or in addition thereto, reactive liquid diluents containing a single epoxy group:

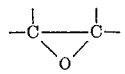

can be used in order to achieve the desired fluidity in the polyepoxide. Among such suitable reactive liquid diluents are butyl glycidyl ether, allyl glycidyl ether, phenyl glycidyl ether, and the like. In determining stoichiometric amounts with respect to the adducts, the presence of "reactive" diluents is taken into account.

Additional materials, such as fillers, pigments, fibers, dyes, plasticizers, peroxides such as benzoylperoxide, accelerators such as triphenyl phosphite and the like can be added either to the polyepoxides or to the adducts, if desired.

In order to cure the polyepoxide compositions of this invention to hard, tough, infusible products, it is customary to heat the compositions at elevated temperatures, generally on the order of about 60° C. to about 200° C. for a period of time ranging from about 1 to 3 hours. The actual heating cycle will depend upon the composition being cured. Room temperature curing, about 25° C. can be effected but generally this takes a number of days.

The compositions of this invention can be molded or cast into many useful articles as for example, electrical castings and the like, as stated previously, and can be used to encapsulate electrical components making these components resistant to thermal and mechanical shock.

The examples which follow are intended to further illustrate the present invention without limiting the scope thereof in any manner.

Example I

A. *Preparation of the organic amine-acrylate adduct.*—Into a triple-necked flask equipped with a stirrer and thermometer, there was added 200 grams of ethylacrylate and 103.2 grams of diethylenetriamine. The resultant mixture was heated, with stirring, until the temperature of the contents of the flask reached 135° C. Heating was discontinued and the liquid, amine-acrylate adduct in the flask was cooled to room temperature, about 25° C. The liquid, amine-acrylate adduct was recovered, in quantitive yield and found to have a nitrogen content, as determined by the Kjeldahl test, of 13.5% and a titratable amine content of 26.3% expressed as diethylenetriamine. The titratable amine content was determined by titrating a sample of the adduct in glacial acetic acid, with perchloric acid to a methyl violet end-point and calculated using the equation:

Titratable amine (as percent diethylenetriamine) =
$$\frac{(\text{ml. of acid})(\text{normality of acid})}{\text{sample wt.}} \times 3.54$$

The equivalent weight of the adduct based on amino hydrogen was 101.

B. *Preparation of a curable composition of diglycidyl ether of 2,2-bis-(p-hydroxyphenyl)-propane and the adduct of 1–A.*—133 grams of the adduct of 1–A was thoroughly admixed at room temperature, about 25° C., with 250 grams of diglycidyl ether of 2,2-bis-(p-hydroxyphenyl)-propane having an epoxide equivalent weight of 192. The composition was cast into bars having the following dimensions: ¼ inch thick, 1 inch wide, and 8 inches long. The bars were then heated according to the following schedule:

16 hours at 50° C.
5½ hours at 80–90° C.
2 hours at 100° C.

and then subjected to tests noted below

Flexural strength (ASTM–D–790–49T) = 2130 p.s.i.*
Flexural modulus (ASTM–D–790–49T) = 0.06 × 10⁶ p.s.i.
Rockwell hardness (M Scale) = 86

---
*Samples did not break at the maximum extension of the testing apparatus.

Example II

A. *Preparation of the amine-acrylate adduct.*—Into a triple-necked flask, equipped with a stirrer and thermometer there was placed 300 grams of diethylenetriamine and 300 grams of 2-ethylhexylacrylate were then added. Upon addition of the 2-ethylhexylacrylate, the temperature of the flask rose to 70° C. Heat was then applied to the flask until the contents of the flask reached a temperature of 150° C. Heating was then discontinued and the liquid, amine-acrylate adduct in the flask was cooled to room temperature, about 25° C. The liquid, amine-acrylate adduct was recovered and found to have a titratable amine assay of 46.98 percent (as diethylenetriamine). The equivalent weight of the adduct based on amino hydrogen was 53.

B. *Preparation of a curable composition of diglycidyl ether of 2,2-bis-(p-hydroxyphenyl)-propane and the adduct of II–A.*—58.6 grams of the adduct of II–A were thoroughly admixed at room temperature, about 25° C., with 100 grams of diglycidyl ether of 2,2-bis-(p-hydroxyphenyl)-propane having an epoxide equivalent weight of 192. The composition was cast into bars having the following dimensions: ½ inch thick, 1.24 inches wide and 8 inches long. The bars were allowed to stand at room temperature, about 25° C., for 1 hour, were thereafter heated at 100° C. for 2 hours and at 150° C. for 2 additional hours, and subjected to various tests which are noted below, along with the results of those tests.

Tensile strength (ASTM–D–638–52T) = 3672 p.s.i.
Tensile modulus (ASTM–D–638–52T) = 0.152 × 10⁶ p.s.i.
Rockwell hardness (L Scale) = 60

In order to further demonstrate the excellent flexibility characteristics of the cured products of the compositions of this invention, Example I was repeated with the exception, however, that a stoichiometric amount of diethylenetriamine was used in place of the adduct. The product obtained had poor flexibility characteristics as indicated by a flexural modulus of 0.46 × 10⁶.

What is claimed is:
1. A curable composition consisting essentially of a polyepoxide having an epoxy equivalency of greater than one wherein the oxygen of each epoxy group is attached to vicinal carbon atoms and a reaction product of an organic amine having the general formula:

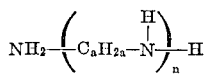

wherein $a$ has a value of 2 to 10 inclusive and $n$ has a value of 1 to 6 inclusive and an acrylate having the general formula:

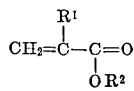

wherein $R^1$ is selected from the group consisting of hydrogen and an alkyl group and $R^2$ is an alkyl radical, said reaction product containing an average of more than two amino hydrogen atoms per molecule, formed on reacting a mixture containing said amine and said acrylate wherein the number of moles of acrylate, per mole of amine, is about 0.5 to a maximum value of about the number of amino hydrogen atoms of the amine minus two and wherein said amine adds across the olefinic double bond of said acrylate and being present in said composition in an amount sufficient to cure said composition to an infusible product.

2. The cured product of the composition defined in claim 1.

3. A curable composition as defined in claim 1 wherein said reaction product is present in said composition in amounts so as to provide from about 0.2 to about 5 amino hydrogen atoms per epoxy group.

4. A curable composition as defined in claim 1 wherein said reaction product is present in said composition in amounts so as to provide from about 0.5 to about 1.5 amino hydrogen atoms per epoxy group.

5. A curable composition as defined in claim 3 wherein said polyepoxide is a polyglycidyl ether of a bis(hydroxyphenyl)alkane.

6. A curable composition as defined in claim 5 wherein the said polyglycidyl ether is diglycidyl ether of 2,2-bis(p-hydroxyphenyl)propane.

7. A curable composition as defined in claim 5 wherein the said reaction product is that of 2-ethylhexylacrylate and diethylenetriamine.

8. A curable composition as defined in claim 5 wherein the said reaction product is that of ethylacrylate and diethylenetriamine.

References Cited by the Examiner

UNITED STATES PATENTS

| | | | |
|---|---|---|---|
| 2,753,323 | 7/1956 | Farnham | 260—2 |
| 2,824,851 | 2/1958 | Hall | 260—47 |
| 2,864,775 | 12/1958 | Newey | 260—47 |
| 2,870,117 | 1/1959 | Vogel et al. | 117—132 |
| 2,883,308 | 4/1959 | Yamada et al. | 117—132 |

OTHER REFERENCES

Hachk's Chemical Dictionary, 3rd edition, 1944, published by McGraw-Hill Company (page 310 relied on; copy in Div. 60).

WILLIAM H. SHORT, *Primary Examiner.*

MILTON STERMAN, JOSEPH R. LIBERMAN, ALLAN LIBERMAN, TIMOTHY D. KERWIN, *Assistant Examiners.*